United States Patent [19]
Rockwell et al.

[11] Patent Number: 6,138,909
[45] Date of Patent: Oct. 31, 2000

[54] MEDIA HANDLING SYSTEM AND METHOD

[75] Inventors: Scott M. Rockwell, Aurora; Andrew L. Gross, Denver, both of Colo.

[73] Assignee: Advanced Digital Information Corporation, Redmond, Wash.

[21] Appl. No.: 09/120,975

[22] Filed: Jul. 22, 1998

[51] Int. Cl.[7] .................................................. G06K 15/00
[52] U.S. Cl. ............................ 235/383; 235/385; 29/704
[58] Field of Search ................................... 235/383, 375, 235/385, 462.01, 462.25; 29/709, 740

[56] References Cited

U.S. PATENT DOCUMENTS

| | | | |
|---|---|---|---|
| 5,303,214 | 4/1994 | Kulakowski et al. | 369/34 |
| 5,450,254 | 9/1995 | Sato et al. | 360/71 |
| 5,498,116 | 3/1996 | Woodruff et al. | 414/331 |
| 5,581,522 | 12/1996 | Sibuya et al. | 369/36 |
| 5,595,263 | 1/1997 | Pignataro | 235/383 |
| 5,661,287 | 8/1997 | Schaefer | 235/383 |
| 5,880,443 | 3/1999 | McDonald et al. | 235/375 |

*Primary Examiner*—Karl D. Frech
*Assistant Examiner*—Daniel St. Cyr
*Attorney, Agent, or Firm*—Seed IP Law Group PLLC

[57] ABSTRACT

A media handling system includes a data cartridge processor having an opening to receive a data cartridge. The data cartridge processor functions to read data from or record data to the data cartridge. The system also includes a gripper for inserting the data cartridge into the opening of the data cartridge processor and an actuator to effect movement of the gripper. A code symbol is affixed to the data cartridge processor and a code reader is associated with the gripper to read the code symbol for locating the opening of the data cartridge processor. The system optionally includes an alignment bracket affixed to the data cartridge processor. The alignment bracket includes a guide having a tapered surface extending outwardly from the opening in the data cartridge processor for further aligning of the data cartridge with the opening of the data cartridge processor.

31 Claims, 3 Drawing Sheets

MEDIA HANDLING SYSTEM AND METHOD

TECHNICAL FIELD OF THE INVENTION

The present invention relates generally to mass data storage libraries, and more particularly, to a media handling system and method.

BACKGROUND OF THE INVENTION

Mass data storage libraries are used to store and retrieve data quickly and efficiently. An example of a mass data storage library includes data cartridges for storing data, data cartridge processors for recording data to or reading data from the data cartridges, a storage rack or library for holding or storing the data cartridges, a gripper or transport mechanism for transporting the data cartridges between the storage rack and the data cartridge processors, and a computer system for directing the gripper to the appropriate data cartridge processor or storage rack location.

The data cartridges may include different types of recording media such as cassettes, floppy disks, diskettes, optical disks, compact disks and the like. Accordingly, the data cartridge processors and the storage rack include openings for receiving the data cartridges.

Mass data storage libraries, however, suffer several disadvantages. For example, the location of each data cartridge processor and storage rack within the mass data storage library must be stored in the computer system so that the gripper can be directed to the appropriate locations. Manufacturing variations between data cartridge processors, storage racks, and grippers result in location variability within the mass storage library. Thus, failure of the gripper to accurately locate a data cartridge processor or storage rack will require manually inserting or removing the data cartridges into or from the data cartridge processors and storage rack. However, manually inserting or removing the data cartridges from the data cartridge processors or storage rack is inefficient, especially in large mass data storage libraries. Additionally, insertion of a data cartridge into an incompatible data cartridge processor will result in system failure.

SUMMARY OF THE INVENTION

In accordance with the present invention, a media handling system and method are provided that address disadvantages and problems associated with prior art systems and methods. According to one embodiment of the present invention, a media handling system comprises: a data cartridge processor having an opening to receive the data cartridge; a gripper for inserting the data cartridge into the opening of the data cartridge processor; an actuator to effect movement of the gripper; a first code symbol affixed to the data cartridge processor; and a code reader associated with the gripper to read the first code symbol for locating the opening of the data cartridge processor.

According to another embodiment of the invention, a method for guiding a data cartridge into a read/write data processor comprises the steps of: reading a first code symbol affixed to a data cartridge processor, the data cartridge processor having an opening operable to receive the data cartridge; determining the location of the opening of the data cartridge processor form the first code symbol; and aligning the data cartridge for insertion in the opening of the data cartridge processor.

The invention provides several technical advantages. For example, the invention provides greater efficiency than conventional systems. In one embodiment of the invention, a code reader is associated with the gripper to automatically store the location of each data cartridge processor and storage rack. In the same embodiment, compatibility of the data cartridge and data cartridge processor is verified prior to inserting the data cartridge into the data cartridge processor.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

Embodiments of the present invention and its advantages are best understood by referring to FIGS. 1–4 of the drawings, like numerals being used for like and corresponding parts of the various drawings.

Figure 1:
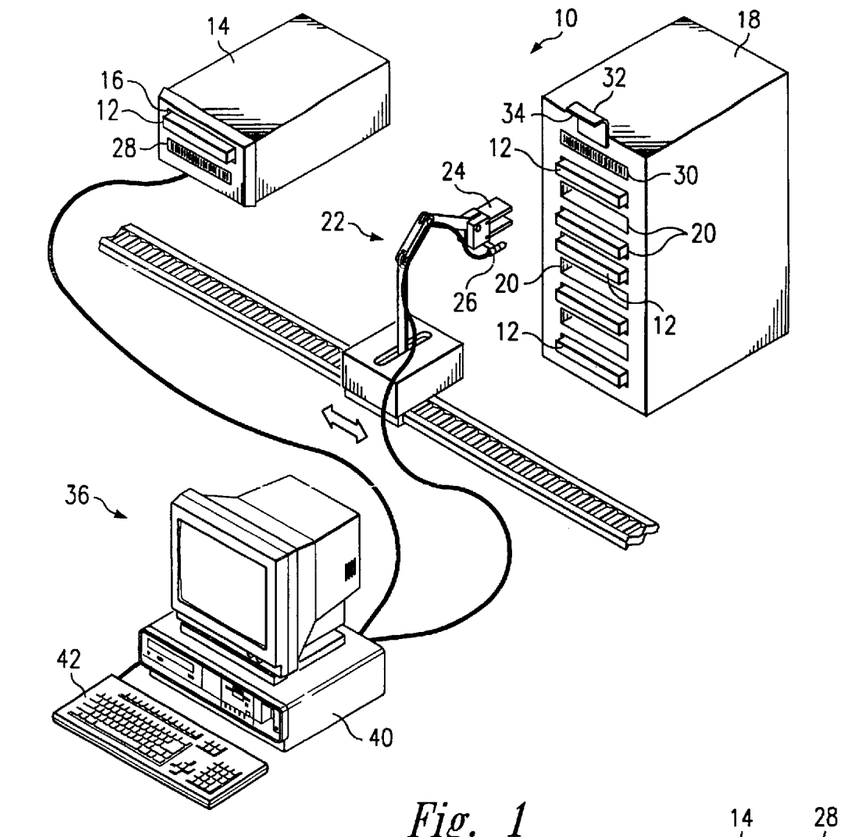
FIG. 1 is an isometric drawing of a media handling system in accordance with the present invention.

FIG. 1 illustrates an isometric view of a media handling system 10 in accordance with the present invention. The media handling system 10 includes at least one data cartridge 12, at least one data cartridge processor 14, and at least one storage rack or library 18. The data cartridge processor 14 functions to retrieve data from or record data to the data cartridge 12 and includes an opening 16 for receiving the data cartridge 12. The storage rack 18 includes a plurality of storage trays or compartments 20 for holding or storing a number of data cartridges 12. Data cartridges 12 may include different types of recording media such as cassettes, compact disks, optical disks, and the like. Additionally, multiple storage racks 18 may be included in the media handling system 10 to accommodate increased capacity requirements for stored data.

The media handling system 10 also includes a gripper 22 for grasping or holding data cartridges 12. In one embodiment of the invention, the gripper 22 includes a plurality of fingers 24 for grasping or holding the data cartridges 12. In operation, the gripper 22 using fingers 24 functions to grasp and hold the data cartridge 12 and insert or remove the data cartridge 12 form the data cartridge processor 14 and storage rack 18. Additionally, gripper 22 functions to transfer data cartridges 12 between the storage rack 18 and the data cartridge processor 14. In one embodiment of the invention, gripper 22 includes a robotic mechanism driven by an actuator for transferring data cartridges 12 between the storage rack 18 and the data cartridge processor 14. However, gripper 22 may include other suitable methods or devices for transferring data cartridges 12 from one location to another. The actuator optionally includes an electrically powered motor or other types of motors, such as air or hydraulically powered motors.

Media handling system 10 also includes a code reader 26, code symbols 28 and 30, and a touch bracket 32. The code reader 26 is attached to the gripper 22 and functions to scan or read the code symbols 28 and 30. For example, in one embodiment of the invention, code symbols 28 and 30 include bar code symbols and code reader 26 includes a bar code reader. However, other suitable types of codes or symbols and readers may be used. Code symbol 28 is attached to the data cartridge processor 14 and code symbol 30 is attached to the storage rack 18. The touch bracket 32 includes an outwardly extending touch stop 34, the edges of which are locatable using fingers 24 of gripper 22. In one embodiment of the invention, the touch bracket 32 is attached to the storage rack 18; however, the touch bracket 32 may be located at other suitable locations within the media handling system 10. As will be discussed in greater detail in conjunction with FIG. 3, the code reader 26, the code symbols 28 and 30, and the touch stop 34 function to accurately locate the locations of the data cartridge processor 14 and the storage rack 18 within the media handling system 10.

Figure 2:
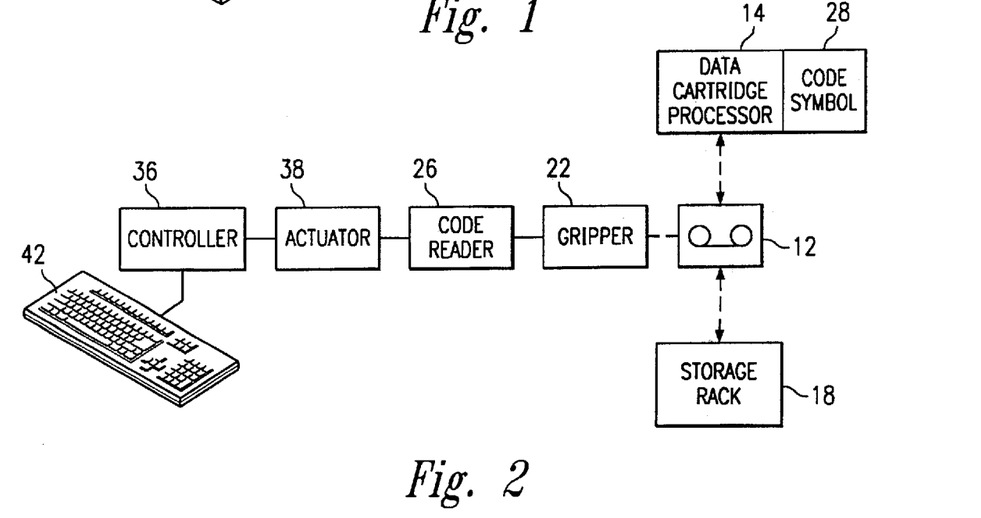
FIG. 2 is a block diagram of the system shown in FIG. 1.

Referring to FIGS. 1 and 2, the media handling system 10 also includes a system controller 36 having an output for controlling an actuator 38. The system controller 36 comprises a computer, workstation, mini-computer, mainframe or other computing device 40 associated with a volatile or non-volatile memory. The system controller 36 functions to receive and respond to requests from an operator by means of an operator keyboard 42 to record data to or read data from data cartridges 12. As will be discussed further in conjunction with FIG. 3, the system controller 36 also functions to store and determine the locations of various media handling system 10 components such as the data cartridge processor 14 and the storage rack 18.

Figure 3:
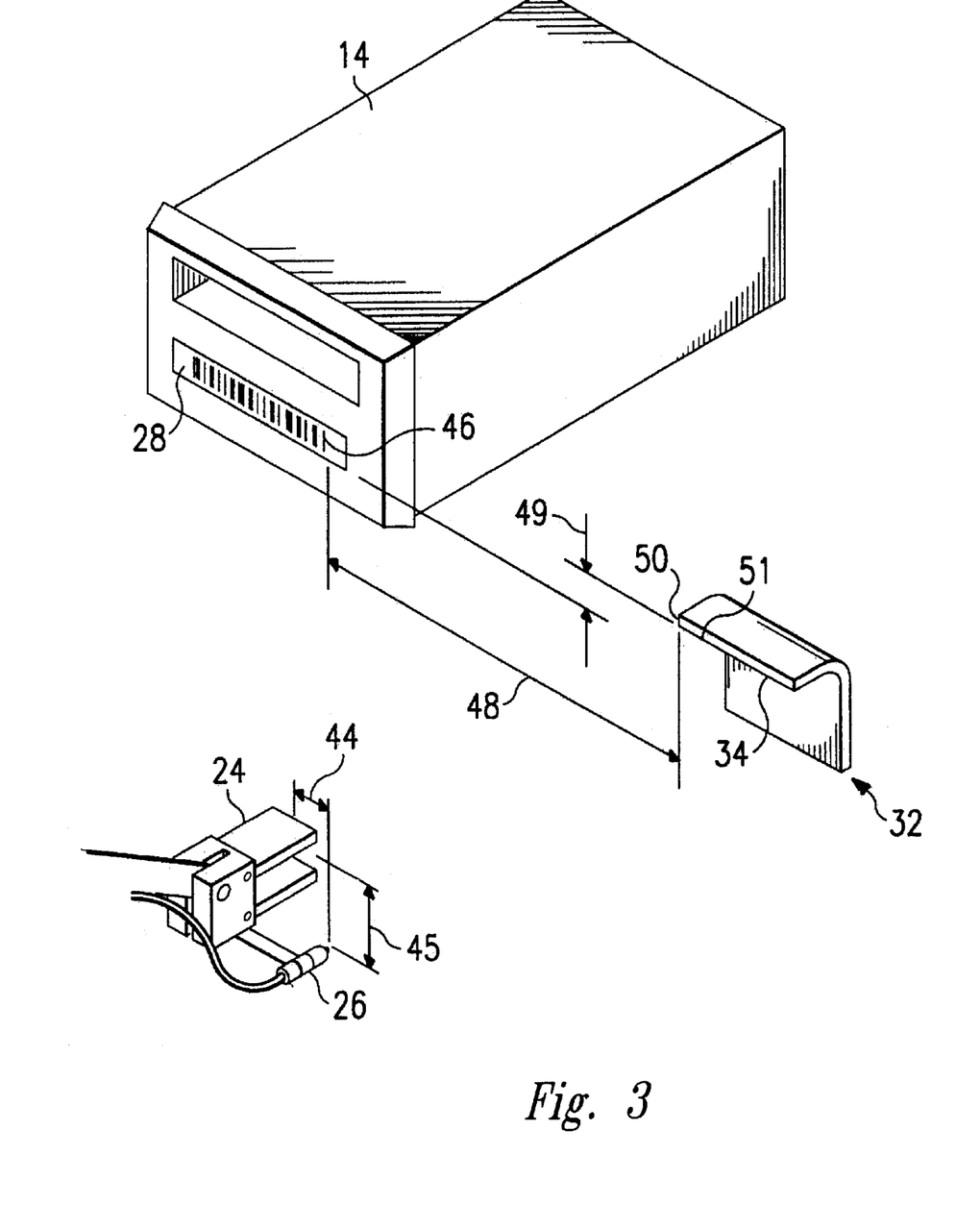
FIG. 3 is an enlarged isometric drawing of a portion of the media handling system shown in FIG. 1.

Referring to FIG. 3, the media handling system 10 determines offset distances 44 and 45 between the code reader 26 and the fingers 24 to correlate the location of the fingers 24 with respect to where the code reader 26 is reading. The distances 44 and 45 are determined using one of the code symbols 28 and 30 and the touch stop 34. For example, the code symbol 28 is affixed to the data cartridge processor 14 so that an edge 46 of the code symbol 28 is located known distances 48 and 49 from edges 50 and 51, respectively, of the touch stop 34. The distances 48 and 49 are stored in the memory of the computing device 40 of the system controller 36 through the operator keyboard 42. Using the fingers 24, the gripper 22 locates the edges 50 and 51 of the touch stop 34 and stores the location of the edges 50 and 51 in the memory of the computing device 40. Additionally, the code reader 26 scans or reads the code symbol 28 and stores the location of the edge 46 of the code symbol 28 in the memory of the computing device 40. The system controller 36 calculates the distance 44 and 45 using the measured distances between the edge 46 and the edges 50 and 51 as determined using the code reader 26 and the fingers 24 and the known distances 48 and 49 stored in the memory of the computing device 40. Thus, the media handling system 10 accurately positions the fingers 24 of the gripper 22 using the code reader 26.

Once the distances 44 and 45 between the code reader 26 and the fingers 24 are determined, the system controller 36 accurately locates each data cartridge processor 14 and storage rack 18 in the media handling system 10 using the code reader 26. For example, the code symbol 28 is affixed to the data cartridge processor 14 so that the edge 46 of the code symbol 28 is located a predetermined distance from the opening 16. This predetermined distance is stored in the memory of the computing device 40 of the system controller 24 through the operator keyboard 42. By locating the edge 46 of the code symbol 28, distances 44 and 45 are used to accurately align the fingers 24 with the opening 16 of the data cartridge processor 14. Additionally, each compartment 20 of the storage rack 18 will be accurately located in a similar manner using code symbol 30.

Figure 4:
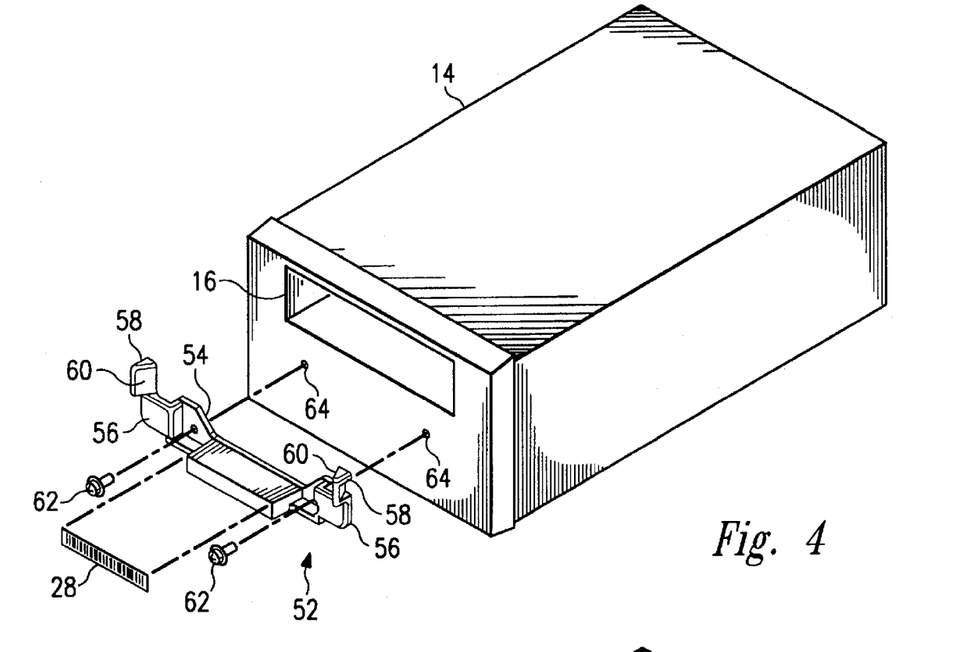
FIG. 4 is an exploded isometric drawing of a data cartridge processor in accordance with the present invention.

Referring to FIG. 4, there is illustrated an exploded isometric view of an alternate embodiment of the data cartridge processor 14 of the media handling system 10 incorporating the present invention. In this embodiment, the data cartridge processor 14 includes an alignment bracket 52. The alignment bracket 52 includes a flat base 54 and a contiguous support 56 at each end of the base 54. Each support 56 extends outwardly from the base 54 and includes a guide 58. Each guide 58 extends outwardly from the support 56 and includes tapered surface 60 for horizontally aligning the data cartridge 12 with the opening 16 of the data cartridge processor 14. The alignment bracket 52 is attached to the data cartridge processor 14 using fasteners 62 to position the guides 58 on opposite sides of the opening 16. It should be understood that other suitable methods or devices for attaching the alignment bracket 52 to the data cartridge processor 14 may be used. Thus, the media handling system 10 provides additional alignment of the data cartridge 12 with the opening 16 of the data cartridge processor 14 using the alignment bracket 52.

In the embodiment described above, the code symbol 28 is affixed to an outwardly facing surface of the alignment bracket 52 for reading or scanning by the code reader 26. By affixing the code symbol 28 to the alignment bracket 52, the code symbol 28 is located a predetermined distance form the opening 16 of the data cartridge processor 14. For example, a plurality of holes 64 are drilled in the data cartridge processor 14 at predetermined distances from the opening 16. The holes 64 may be located and drilled in any number of data cartridge processors 14 so that the location of the alignment bracket 52 is uniform with respect to the opening 16 of each data cartridge processor 14. Additionally, the code symbol 28 may be uniformly located on each alignment bracket 52. Thus, by locating the edge 46 of the code symbol 28 on any data cartridge processor 14, a data cartridge 12 can be properly aligned with the opening 16 of the data cartridge processor 14.

Another technical advantage of the present invention is the ability to determine compatibility of the data cartridge 12 with the data cartridge processor 14 prior to inserting the data cartridge 12 into the data cartridge processor 14. For example, the code symbol 28 may include information relating to the type or model of the data cartridge processor 14. Thus, when scanning or reading the code symbol 28 using the code reader 26 to determine the location of the opening 16, information relating to the data cartridge processor 14 will also be processed by the system controller 36. Therefore, the media handling system 10 provides greater reliability than conventional systems by verifying the compatibility of the data cartridge 12 with the data cartridge processor 14 prior to inserting the data cartridge 12 into the data cartridge processor 14.

Another technical advantage of the present invention is the ability to classify storage racks 18 using the code symbol 30. For example, a plurality of storage racks 18 may be used in the media handling system 10 with each storage rack 18 containing a particular type of data cartridge 12 and/or data cartridges 12 pertaining to a particular customer account. The code symbol 30 affixed to each storage rack 18 may include the data cartridge 12 type and/or customer account information designated for each storage rack 18. Thus, when the code reader 26 reads or scans each code symbol 30 to determine location information of the compartments 20, the data cartridge 12 type or customer account information will also be processed by the system controller 36.

Figure 5:
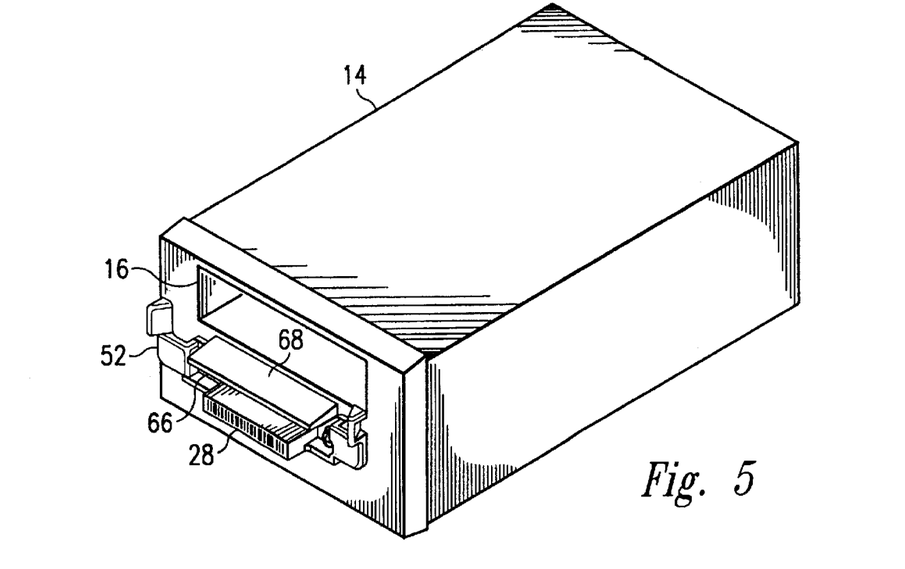
FIG. 5 is an isometric drawing of an alternate embodiment of a data cartridge processor in accordance with the present invention.

Referring to FIG. 5, an alternate embodiment of the alignment bracket 52 is shown in accordance with the present invention. In this embodiment, the alignment bracket 52 includes an outwardly extending bottom guide 66. Bottom guide 66 includes an outwardly and downwardly extending tapered surface 68 for vertically aligning the data cartridge 12 with the opening 16 of the data cartridge processor 14. The code symbol 28 is affixed to an outwardly facing surface of the alignment bracket 52 beneath the bottom guide 66 for reading by the code reader 26. Thus, the media handling system 10 provides additional alignment of the data cartridge 12 with the opening 16 of the data cartridge processor 14 using the alignment bracket 52.

Additionally, the media handling system 10 provides greater flexibility than conventional systems by allowing manual verification of compatibility between the data cartridge 12 and the data cartridge processor 14. For example, the code symbol 28 may be affixed to the data cartridge processor 14 so that identification information of the data cartridge processor 14 is visible to an operator. Additionally, the alignment bracket 52 may be constructed from a transparent material allowing identification information of the data cartridge processor 14 to be visible to an operator.

Although the present invention and its advantages have been described in detail, it should be understood that various changes, substitutions, and alterations can be made therein without departing from the spirit and scope of the present invention as defined by the appended claims.

What is claimed is:

1. A media handling system using a data cartridge, comprising:
    a data cartridge processor having an opening to receive the data cartridge;
    a gripper configured to at least one of insert the data cartridge into or remove the data cartridge from the processor opening;
    a first code symbol affixed to the data cartridge processor, the first code symbol having information content about the data cartridge processor other than location information and a detectable position reference at a fixed location relative to the processor opening and at a predetermined distance from the processor opening;
    a code reader associated with the gripper and mounted to move with the gripper, the code reader being operable to read the first code symbol to acquire the information content about the data cartridge processor and detect the position reference of the first code symbol when the gripper is moved to place the code reader in a position to read the first code symbol; and
    an actuator coupled to the gripper to effect movement thereof, the actuator being operatively coupled to receive information from the code reader, including the detection by the code reader of the position reference, the actuator using the information on detection of the position reference to move the gripper from a current position toward the processor opening for removing from or inserting into the processor opening the data cartridge, the actuator being configured to calculate required movement of the gripper after the code reader reads the first code symbol to accurately move the gripper to the processor opening based upon the predetermined distance of the position reference to the processor opening.

2. The system of claim 1, wherein the first code symbol includes a bar code.

3. The system of claim 1, wherein the first code symbol information content includes identification information about the data cartridge processor read by the code reader.

4. The system of claim 3, further comprising a controller determining compatibility of the data cartridge with the data cartridge processor based upon the identification information read by the code reader prior to insertion of the data cartridge into the processor opening.

5. The system of claim 1, wherein the position reference is an edge portion of the first code symbol.

6. The system of claim 1, further including a storage library and wherein the gripper is configured to transport the data cartridge between the storage library and the data cartridge processor.

7. The system of claim 6,
    wherein the storage library includes a storage library rack having at least one compartment for storing the data cartridge; and further comprising:
    a second code symbol affixed to the storage library rack, the second code symbol having information content about the storage library rack other than location information and a detectable position reference at a fixed location relative to the compartment and a predetermined distance from the compartment; and
    wherein the code reader is operable to read the second code symbol to acquire the information content about the storage library rack and detect the position reference of the second code symbol when the gripper is moved to place the code reader in position to read the second code symbol, and wherein the actuator is operatively coupled to receive the detection by the code reader of the position reference of the second code symbol, the actuator using the information on detection of the position reference of the second code symbol to move the gripper from a current position toward the compartment.

8. The system of claim 7, wherein the second code symbol includes identification information about the storage library rack read by the code reader.

9. The system of claim 1, further comprising:
    a data cartridge alignment bracket attached to the data cartridge processor in the area of the processor opening, the alignment bracket including a sloped engagement surface sloped toward the processor opening to guide the data cartridge toward the processor opening upon engagement therewith when the gripper is moving to insert the data cartridge into the processor opening, the first code symbol being affixed to the alignment bracket.

10. The system of claim 9, wherein the alignment bracket comprises:
    a base attached to the data cartridge processor; and
    the sloped engagement surface being supported by and extending outwardly from the base, the sloped engagement surface being positioned at an edge of the processor opening and positioned to align the data cartridge to pass by the edge of the processor opening upon insertion therein.

11. The system of claim 10, wherein the alignment bracket further comprises a bottom guide extending outwardly from the base, the bottom guide having a sloped engagement surface sloped toward the processor opening to guide the data cartridge toward the processor opening upon engagement therewith when the gripper is moving to insert the data cartridge into the processor opening.

12. The system of claim 11, wherein the sloped engagement surface of the bottom guide is positioned at a lower edge of the processor opening and positioned to align the data cartridge to pass by the lower edge of the processor opening upon insertion therein.

13. The system of claim 9, wherein the alignment bracket is formed from a substantially transparent material.

14. The system of claim 1, wherein the actuator determines the location of the processor opening relative to the current position of the gripper when the code reader detects the position reference of the first code symbol.

15. The system of claim 1, wherein the actuator includes a controller portion which receives the information from the code reader and uses the detection of the position reference to determine movement instructions to move the gripper toward the processor opening, and further includes a gripper actuator portion which receives the movement instructions from the controller portion and in response thereto effects movement of the gripper to the processor opening.

16. The system of claim 1, wherein the gripper is configured to engage the data cartridge, and the gripper and the code reader are at unknown spaced-apart positions relative to each other, and further including a contact member at a fixed location and at a predetermined distance from a position reference of a positioning code symbol, the contact member being located and sized such that the actuator can move the gripper into contact therewith, the actuator being operable to determine relative spaced-apart positions of the code reader and the gripper by moving the gripper into contact with the contact member and thereby determine a location of the gripper when in contact with the contact member, and moving the gripper to position the code reader to read the positioning code symbol and thereby detect and determine a location of the gripper when the code reader is in position to read the position reference of the positioning code symbol, the actuator being configured to determine an amount of movement of the gripper between the location of the contact member and the position reference of the positioning code symbol, and calculate relative spaced-apart positions of the gripper and the code reader, and to adjust further movements of the gripper toward the processor opening after the code reader reads the first code symbol based upon the calculated relative spaced-apart positions of the gripper and the code reader.

17. The system of claim 1, further comprising:
first and second alignment members positioned at the data cartridge processor in the area of the processor opening on opposing sides of the processor opening, each of the first and second members including a sloped engagement surface sloped toward the processor opening to guide the data cartridge toward the processor opening upon engagement therewith when the gripper is moving to insert the data cartridge into the processor opening.

18. The system of claim 17, wherein the sloped engagement surfaces of the first and second alignment members project outwardly from the data cartridge processor, the sloped engagement surface of the first alignment member being positioned at a left edge of the processor opening in position to align the data cartridge to pass by the left edge of the processor opening upon insertion therein, and the sloped engagement surface of the second alignment member being positioned at a right edge of the processor opening in position to align the data cartridge to pass by the right edge of the processor opening upon insertion therein.

19. The system of claim 17, wherein the first and second alignment members are supported by a base attached to the data cartridge processor and the sloped engagement surfaces extend outwardly from the base, the sloped engagement surface of the first alignment member being positioned at a left edge of the processor opening in position to align the data cartridge to pass by the left edge of the processor opening upon insertion therein, and the sloped engagement surface of the second alignment member being positioned at a right edge of the processor opening in position to align the data cartridge to pass by the right edge of the processor opening upon insertion therein.

20. A method for positioning a data cartridge in a media handling system having a gripper configured to hold and move the data cartridge, and a code reader associated with the gripper and mounted to move therewith, and having a data cartridge processor with an opening to receive the data cartridge therein, comprising the steps of:
moving the gripper into a position so the code reader can read a first code symbol affixed to the data cartridge processor having information content about the data cartridge processor other than location information, the first code symbol further having a detectable position reference at a fixed location relative to the processor opening and at a predetermined distance from the processor opening;
reading the first code symbol to acquire the information content about the data cartridge processor;
detecting the position reference of the first code symbol;
using the detected position reference to calculate the required movement of the gripper after the code reader reads the first code symbol to accurately move the gripper from a current position of the gripper toward the processor opening based upon the predetermined distance of the position reference to the processor opening; and
upon the gripper arriving at the processor opening from the current position, removing from or inserting into the processor opening the data cartridge.

21. The method of claim 20, wherein the step of reading the first code symbol comprises reading a bar code.

22. The method of claim 20, further comprising verifying compatibility of the held data cartridge with the data cartridge processor using the information content about the data cartridge processor read from the first code symbol.

23. The method of claim 20, further comprising transporting the held data cartridge form a storage rack to the data cartridge processor.

24. The method of claim 20, further comprising aligning the held data cartridge with the processor opening using an alignment bracket affixed to the data cartridge processor.

25. The method of claim 20, further comprising:
moving the gripper with or without the held data cartridge into a position so the code reader can read a second code symbol affixed to a storage library having information content about the storage library other than location information, the storage library having a compartment for storing the data cartridge, the second code symbol further having a detectable position reference at a fixed location relative to the compartment and at a predetermined distance from the compartment;
reading the second code symbol to acquire the information content about the storage library;
detecting the position reference of the second code symbol; and
using the detected position reference of the second code symbol to move the gripper from a library current position of the gripper board the compartment based upon the predetermined distance of the position reference of the second code symbol to the compartment; and upon the gripper arriving at the compartment from the library current position, removing from or inserting into the compartment the data cartridge.

26. The method of claim 25, further comprising the step of determining identification information about the storage library from the information content about the storage library read from the second code symbol read by the code reader.

27. The method of claim 20, wherein the gripper and the code reader are at unknown spaced-apart positions relative to each other, the media handling system includes a contact member at a fixed location and at a predetermined distance from a position reference of a positioning code symbol, the method further comprising the steps of:

moving the gripper into contact with the contact member;

determining a location of the gripper when in contact with the contact member;

moving the gripper to position the code reader to read the positioning code symbol and thereby detect the position reference of the positioning code symbol;

determining a location of the gripper when the code reader is in position to read the position reference of the positioning code symbol;

determining an amount of movement of the gripper between the location of the contact member and the position reference of the positioning code symbol;

calculating relative spaced-apart positions of the gripper and the code reader; and adjusting further movements of the gripper toward the processor opening after the code reader reads the first code symbol based upon the calculated relative spaced-apart positions of the gripper and the code reader.

28. A media handling system using a data cartridge, comprising:

a data cartridge processor having an opening to receive the data cartridge;

a gripper configured to at least one of insert the data cartridge into or remove the data cartridge from the processor opening, the gripper being configured to engage the data cartridge;

a first code symbol affixed to the data cartridge processor, the first code symbol having information content about the data cartridge processor other than location information and a detectable position reference at a fixed location relative to the processor opening and at a predetermined distance from the processor opening;

a code reader associated with the gripper and mounted to move with the gripper, the gripper and the code reader being at unknown spaced-apart positions relative to each other, the code reader being operable to read the first code symbol to acquire the information content about the data cartridge processor and detect the position reference of the first code symbol when the gripper is moved to place the code reader in a position to read the first code symbol;

an actuator coupled to the gripper to effect movement thereof, the actuator being operatively coupled to receive information from the code reader, including detection by the code reader of the position reference, the actuator using the information on detection of the position reference to move the gripper from a current position toward the processor opening for removing from or inserting into the processor opening the data cartridge; and a contact member at a fixed location and a predetermined distance from the position reference of the first code symbol, the contact member being located and sized such that the actuator can move the gripper into contact therewith, the actuator being operable to determine relative spaced-apart positions of the code reader and the gripper by moving the gripper into contact with the contact member and thereby determine a location of the gripper when in contact with the contact member, and moving the gripper to position the code reader to read the first code symbol and thereby detect and determine a location of the gripper when the code reader is in position to read the position reference of the first code symbol, the actuator being configured to determine an amount of movement of the gripper between the location of the contact member and the position reference of the first code symbol, and calculate relative spaced-apart positions of the gripper and the code reader, and to adjust further movements of the gripper toward the processor opening after the code reader reads the first code symbol based upon the calculated relative spaced-apart positions of the gripper and the code reader.

29. A method for positioning a data cartridge in a media handling system having a gripper configured to hold and move the data cartridge, and a code reader associated with the gripper and mounted to move therewith, and having a data cartridge processor with an opening to receive the data cartridge therein, the gripper and the code reader being at unknown spaced-apart positions relative to each other, and the media handling system including a contact member at a fixed location and a predetermined distance from a detectable position reference of a first code symbol affixed to the data cartridge processor having information content about the data cartridge processor other than location information, the position reference being at a fixed location relative to the processor opening and at a predetermined distance from the processor opening, comprising the steps of:

moving the gripper into a position so the code reader can read the first code symbol;

reading the first code symbol to acquire the information content about the data cartridge processor;

detecting the position reference of the first code symbol;

using the detected position reference to move the gripper from a current position to the gripper toward the processor opening based upon the predetermined distance of the position reference to the processor opening;

upon the gripper arriving at the processor opening from the current position, removing from or inserting into the processor opening the data cartridge;

moving the gripper into contact with the contact member;

determining a location of the gripper when in contact with the contact member;

moving the gripper to position the code reader to read the first code symbol and thereby detect the position reference of the first code symbol;

determining a location of the gripper when the code reader is in position to read the position reference of the first code symbol;

determining an amount of movement of the gripper between the location of the contact member and the position reference of the first code symbol;

calculating relative spaced-apart positions of the gripper and the code reader; and adjusting further movements of the gripper toward the processor opening after the code reader reads the first code symbol based upon the calculated relative spaced-apart positions of the gripper and the code reader.

30. A media handling system using a data cartridge, comprising:

a data cartridge processor having an opening to receive the data cartridge;

a gripper configured to at least one of insert the data cartridge into or remove the data cartridge from the processor opening, the gripper being configured to engage the data cartridge;

a positioning code symbol having a detectable position reference at a fixed location;

a code reader associated with the gripper and mounted to move with the gripper, the gripper and the code reader being at unknown spaced-apart positions relative to each other, the code reader being operable to read the positioning code symbol when the gripper is moved to place the code reader in a position to read the positioning code symbol;

an actuator coupled to the gripper to effect movement thereof, the actuator being operatively coupled to receive information from the code reader, the actuator being operable to remove the data cartridge from or insert the data cartridge into the processor opening; and a contact member at a fixed location and a predetermined distance from the position reference of the positioning code symbol, the contact member being located and sized such that the actuator can move the gripper into contact therewith, the actuator being operable to determine relative spaced-apart positions of the code reader and the gripper by moving the gripper into contact with the contact member and thereby determine a location of the gripper when in contact with the contact member, and moving the gripper to position the code reader to read the positioning code symbol and thereby detect and determine a location of the gripper when the code reader is in position to read the position reference of the positioning code symbol, the actuator being configured to determine an amount of movement of the gripper between the location of the contact member and the position reference of the positioning code symbol, and calculate relative spaced-apart positions of the gripper and the code reader, and to adjust further movements of the gripper relative to the processor opening after the code reader once reads the positioning code symbol based upon the calculated relative spaced-apart positions of the gripper and the code reader.

31. A method for positioning a data cartridge in a media handling system having a gripper configured to hold and move the data cartridge, and a reader associated with the gripper and mounted to move therewith, and having a data cartridge processor with an opening to receive the data cartridge therein, the gripper and the reader being at unknown spaced-apart positions relative to each other, and the media handling system including a contact member at a fixed location and a predetermined distance from a position reference readable by the reader, the position reference being at a fixed location, comprising the steps of:

moving the gripper to at least one of remove the data cartridge from and insert the data cartridge into the processor opening;

moving the gripper into contact with the contact member;

determining a location of the gripper when in contact with the contact member;

moving the gripper to position the reader to read the position reference;

determining a location of the gripper when the reader is in position to read the position reference;

determining an amount of movement of the gripper between the location of the contact member and the position reference;

calculating relative spaced-apart positions of the gripper and the reader; and adjusting further movements of the gripper relative to the processor opening after the reader reads the position reference based upon the calculated relative spaced-apart positions of the gripper and the reader.

* * * * *

UNITED STATES PATENT AND TRADEMARK OFFICE
CERTIFICATE OF CORRECTION

PATENT NO. : 6,138,909
DATED : Oct. 31, 2000
INVENTOR(S) : Scott M. Rockwell and Andrew L. Gross It is certified that error appears in the above-identified patent and that said Letters Patent is hereby corrected as shown below:

Claim 25, column 9, line 1, "board the compartment" should read --toward the compartment--.

Signed and Sealed this

First Day of May, 2001

Attest:

NICHOLAS P. GODICI

Attesting Officer     Acting Director of the United States Patent and Trademark Office